Dec. 15, 1953     T. I. THOMPSON     2,662,969
GLOVE COMPARTMENT LIGHT
Filed Oct. 22, 1949
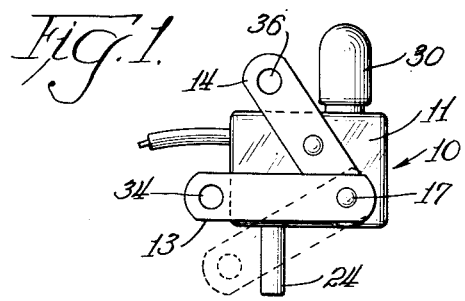
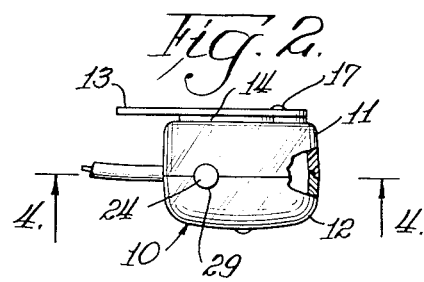
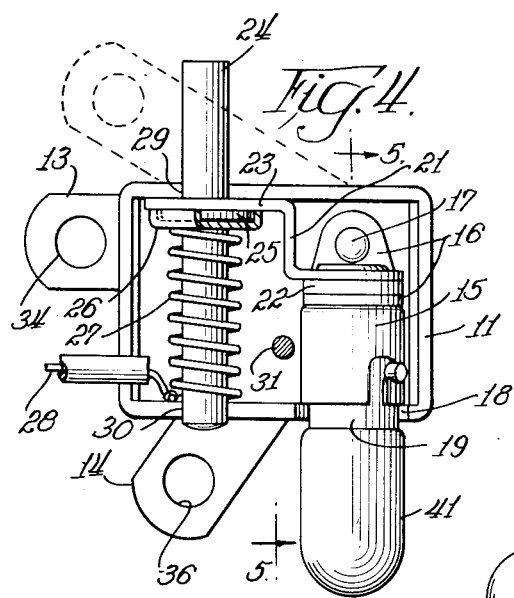
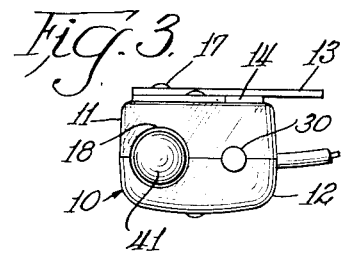
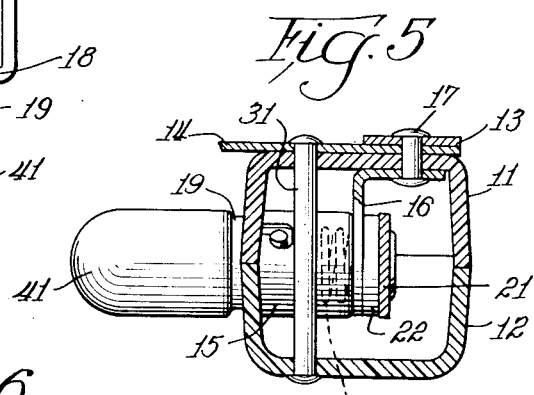
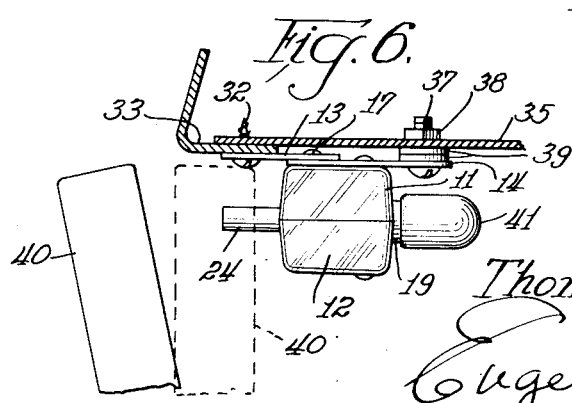
INVENTOR.
Thomas I. Thompson
BY
Eugene M Giles atty.

Patented Dec. 15, 1953

2,662,969

UNITED STATES PATENT OFFICE 2,662,969

GLOVE COMPARTMENT LIGHT

Thomas I. Thompson, Chicago, Ill.

Application October 22, 1949, Serial No. 123,000

3 Claims. (Cl. 240—7.1)

My invention relates to lighting facilities for glove compartments and the like and has more particular reference to a combined switch, light, and bracket unit which may be installed quite readily in such compartments and which may be operated by the compartment doors.

It is often desirable to provide a light in a glove compartment or in a similar place so that the light may be operated by the opening and closing of the door, particularly where such compartment was not originally equipped with lighting facilities.

The objects of my invention are to provide an improved switch and light unit which is particularly applicable as an accessory in automobile glove compartments or the like; to construct the unit with universal mounting facilities whereby it is readily applicable in various different glove compartment structures and selectively locatable therein for operation by the compartment door; to utilize a pivoted mounting arm which cooperates with a fixed mounting member to provide universality of mounting and selective positioning in glove compartments; and in general to provide a compact and attractive door controllable lighting unit which is particularly convenient to install, of simple and durable construction and economical to manufacture, these and other objects being accomplished as hereinafter described, reference being had to the accompanying drawing in which:

Fig. 1 is a top view of a combination switch, light, and bracket unit embodying my invention;

Fig. 2 is a view of said unit taken from the bottom of Fig. 1;

Fig. 3 is a view of said unit taken from the top of Fig. 1;

Fig. 4 is a view taken on the line 4—4 of Fig. 2 of the unit with the lower half of the housing removed;

Fig. 5 is a sectional view taken on the line 5—5 of Fig. 4; and

Fig. 6 is an end view of said unit installed in a glove compartment and showing fragmentary part of the compartment in section.

Referring now to the drawing, the combined switch, light, and bracket unit which is designated as a whole by the reference numeral 10, comprises a casing composed of a top 11 and a bottom 12 with a movable mounting member 13, and a stationary mounting member 14 secured to said top 11.

In a preferred form of my invention, the top 11 and the bottom 12 are molded of electrically non-conductive thermoplastic material such as polystyrene and they cooperate to form the casing within which the switch and the light socket are enclosed.

A cylindrical socket shell 15 is attached to the top 11 by means of an L-shaped metallic member 16 which is riveted to said top 11, a rivet 17 being engaged through the overlapping ends of the two mounting members 13 and 14, respectively. When the unit 10 is installed, either or both of the mounting members 13 and 14 are secured to exposed metal of the glove compartment and this provides an electrical grounding.

The socket shell 15 is positioned within the unit 10 so that it is aligned with a circular openning 18 in said casing of sufficient size to permit insertion of a bulb base 19. The bulb base 19 as shown in Fig. 4 is of the bayonet type and the cylindrical socket shell 15 corresponds therewith, although the threaded type of bulb and socket may be used if preferred.

The socket shell 15 has a center contact spring 20 which is connected to the metal connector 21 and insulated from the shell 15 and from the L-shaped member 16 by means of an insulating insert 22. A free end 23 of the metal connector is provided with a circular opening adapted to encircle a plunger 24.

The plunger 24 has a circumferential bead 25 which is somewhat larger in diameter than the opening through the free end 23 of the metal connector 21 and serves to prevent withdrawal of said plunger 24 from the unit 10. The bead 25 is capped by a metal collar 26 upon which is seated one end of a helical spring 27, the other end of said spring 27 being connected to a wire 28 which leads to a source of electric current.

The plunger 24 is slidably engaged at each end in circular openings 29 and 30, each formed by opposed matching semi-circular openings in the top 11 and bottom 12 respectively of the unit 10. One end of the plunger-encircling spring 27 bears against the inner wall of the unit 10 and the opposite end bears against the metal collar 26, thus holding the turned down outer edges of said collar in contact with the free end 23 of the connector 21. This contact completes an electrical circuit thus causing the bulb 41 to be illuminated. The circuit is broken when the plunger 24 is pressed inwardly against the pressure of the spring 27, thus disengaging the collar 26 from the free end 23 of the connector 21.

The top 11 and bottom 12 are joined together by means of cementing or by rendering the joining edges tacky with suitable solvent, such as carbon tetrachloride in the case of a polystyrene casing, and the joinder is secured by means of the pin 31 which is engaged at the top through the stationary bracket 14 and riveted thereto. In order to insure proper alignment of the respective halves of the unit 10, the top 11 and the bottom 12 may be tongue and grooved at opposite ends as shown in section in the cutaway portion of Fig. 2.

The unit 10 is mounted in any selected location by first removing a screw 32 from the metal rim portion 33 surrounding the opening of the glove compartment or the like in the approximate place where the unit 10 is to be installed. The paint on the metal rim 33 surrounding the screw hole should be removed by scraping in order to permit good electrical contact therewith. The movable mounting member or bracket 13 is then secured thereto by inserting the screw 32 through the hole 34 in the free end of the movable bracket 13 and reinstalling the screw 32 in the metal frame. Before tightening the screw 32 in the metal frame, the unit 10 is moved as permitted by the movable bracket 13 until the desired location is determined. This location may be anywhere adjacent to the compartment opening where the protruding end of the plunger 24 will be sufficiently deflected by closure of the compartment door to break the contact between the metal collar 26 and the free end 23 of the lead 21.

When the desired location has been determined, a hole is pierced in the wall 35 opposite the hole 36 in the outer end of the stationary mounting member or bracket 14. Ordinarily in glove compartments, the wall 35 is made of cardboard, fiberboard, or the like and may be pierced by any sharp instrument. In other cases, a hole may of course be drilled. The stationary bracket 14 is then secured to the wall 35 by means of a bolt 37 and a nut 38, and any gap therebetween may be filled in with washers 39, and washers may also be used between the bracket 13 and the metal rim 33 where build up is required. The brackets 13 and 14 are of sheet metal and may, of course, be bent to conform to the contour or irregularities of the internal walls of the compartment, and the respective brackets are then secured firmly thereto by tightening the screw 32 and the nut and bolt 37 and 38.

The wire 28 should then be connected to any source of battery current such as at the ignition switch or at other instruments located under the dashboard. When so mounted and installed, the compartment light will remain illuminated when the compartment door 40 is open. When the said door is closed as indicated by the dotted lines in Fig. 6, the plunger 24 is depressed, thus causing the contact between the collar 26 and the lead 21 to be broken, thus breaking the electrical circuit and extinguishing the light.

While I have shown and described my invention in a preferred form, I am aware that various modifications can be made therein without departing from the spirit of my invention, the scope of which is to be determined by the appended claims.

What is claimed is:

1. A door operated light and switch unit of the class described comprising a casing having a reciprocable switch operating plunger projecting from the front thereof, said casing having a top wall with fixed mounting means thereon which projects outwardly therebeyond at the rear of the casing and is adapted to be secured to the underside of an overlying support, and a relatively flat mounting arm which overlies and is pivoted at one end to the top wall of the casing to move in a plane close to and substantially parallel with said top wall, said pivoted mounting arm having the other end thereof projecting outwardly beyond the casing and pivotally movable toward and beyond the front of the casing and adapted to be secured to the underside of an overlying support.

2. In a door operated light and switch unit of the class described, the combination of a casing having a reciprocable switch operating plunger projecting from the front thereof, said casing having a top wall and a pair of relatively flat mounting arms overlying and secured to said top wall and each lying in a plane close to and substantially parallel with said wall, one of said arms being fixed to said wall and having one end thereof projecting beyond the casing at the rear thereof and adapted to be secured to the underside of an overlying support, and the other of said arms being pivoted at one end thereof to the said top wall to move in a plane substantially parallel with said top wall and having the other end thereof projecting outwardly beyond the casing and pivotally movable toward and beyond the front of the casing and adapted to be secured to the underside of an overlying support.

3. A door operated light and switch unit of the class described comprising a two-part casing which has a reciprocable switch operating plunger projecting from the front thereof and a socket supporting bracket within the casing, said casing having a top wall with two fasteners extending therethrough, the two parts of the casing being secured together by one of said fasteners and the socket supporting bracket being secured to said top wall by the other said fasteners, and a pair of relatively flat mounting arms overlying and secured to said top wall and each lying in a plane close to and substantially parallel with said wall, one of said arms being secured to both of said fasteners in a fixed position and having one end thereof projecting beyond the casing at the rear thereof and adapted to be secured to the underside of an overlying support, and the other of said arms being pivoted at one end thereof to one of said fasteners to move in a plane substantially parallel with said top wall and having the other end thereof projecting outwardly beyond the casing and pivotally movable toward and beyond the front of the casing and adapted to be secured to the underside of an overlying support.

THOMAS I. THOMPSON.

References Cited in the file of this patent

UNITED STATES PATENTS

| Number | Name | Date |
|---|---|---|
| 1,063,783 | Donovan | June 3, 1913 |
| 1,171,667 | Schroth | Feb. 15, 1916 |
| 1,341,902 | Hildreth | June 1, 1920 |
| 1,815,701 | Butscher | July 21, 1931 |
| 1,844,380 | Cohen | Feb. 9, 1932 |
| 2,058,566 | Catron et al. | Oct. 27, 1936 |
| 2,111,434 | Morrison | Mar. 15, 1938 |
| 2,156,463 | Schulte | May 2, 1939 |
| 2,164,149 | Underdorfel | June 27, 1939 |
| 2,168,118 | Dickson | Aug. 1, 1939 |
| 2,172,523 | Soreng | Sept. 12, 1939 |
| 2,377,538 | Cohen | June 5, 1945 |